United States Patent
Narin et al.

(10) Patent No.: US 6,691,176 B1
(45) Date of Patent: Feb. 10, 2004

(54) METHOD FOR MANAGING CLIENT SERVICES ACROSS BROWSER PAGES

(75) Inventors: Attila Narin, Kirkland, WA (US); Donald J. Clore, Seattle, WA (US); Keith A. Kegley, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/433,995

(22) Filed: Nov. 4, 1999

(51) Int. Cl.$^7$ ................................................. G06F 9/54
(52) U.S. Cl. ........................ 709/318; 709/316; 709/228
(58) Field of Search ................................. 709/310–320, 709/227, 228

(56) References Cited

U.S. PATENT DOCUMENTS

| | | | | |
|---|---|---|---|---|
| 5,941,957 A | * | 8/1999 | Ingrassia et al. | 709/248 |
| 5,951,643 A | * | 9/1999 | Shelton et al. | 709/227 |
| 5,954,798 A | * | 9/1999 | Shelton et al. | 709/224 |
| 6,094,673 A | * | 7/2000 | Dilip et al. | 709/202 |
| 6,243,092 B1 | * | 6/2001 | Okita et al. | 345/349 |
| 6,345,292 B1 | * | 2/2002 | Daugherty et al. | 709/214 |
| 6,397,253 B1 | * | 5/2002 | Quinlan et al. | 709/227 |
| 6,430,597 B1 | * | 8/2002 | Dilip et al. | 709/202 |

OTHER PUBLICATIONS

Schmidt, Douglas C., "Connector—A Design Pattern for Actively Initializing Network Services", C + + Report, pp(10), Jan. 1996.*

North, Ken, "Database Programming with OLE and ActiveX", DBMS, pp(8), Nov. 1996.*

\* cited by examiner

Primary Examiner—St. John Courtenay, III
(74) Attorney, Agent, or Firm—Woodcock Washburn LLP

(57) ABSTRACT

A service manager for managing services and objects called by browser scripts is employed. The Web browser script is not in direct communication with the service manager; instead, a connector object is mapped by the script into the scripting space. For function calls that the script would previously make to the service or object directly, the script makes a call to a connector object. Depending on the browser brand, the connector object is of a different format e.g., an ActiveX control or a Plug-In. The first time such a connector object is created and mapped into a scripting space, the service manager is initiated and all of the services and objects that are managed by the service manager are loaded. The connector object packages the function call to a service for interpretation by the service manager. A script wrapper is a small object between the scripting space and the connector object, and allows script to be written without regard to different browser brands. The service manager then forwards the service call to the corresponding service or object within its control. The service then performs according to the call and information can flow back to the script via the service manager and connector object e.g., an ActiveX control interface or Plug-In interface. Services managed by the service manager can also send information regarding events to the scripting space by way of the service manager, the connector object, and the script wrapper. An event handler can be implemented by the script author if the event is of interest to the script. As a result of the service manager managing the objects, the destruction and re-creation of objects that typically occurs when objects are mapped directly into the scripting space are avoided. All that is destroyed and re-created are the communication channels (namely the connector object and the script wrapper) between the scripting space and the services that are managed by the service manager. This allows any state within the service to persist across different Web pages, thereby improving users' browsing experience and/or increasing the efficient use of computing resources.

31 Claims, 11 Drawing Sheets

METHOD FOR MANAGING CLIENT SERVICES ACROSS BROWSER PAGES

BACKGROUND OF THE INVENTION

1. Field of the Invention

The present invention relates to the field of client-server computing, and more particularly to a method and system for managing client services interacting with multiple browser pages.

2. Brief Description of Prior Developments

There has recently been a tremendous growth in the number of computers connected to the Internet. A client computer connected to the Internet can download digital information from server computers. Client application software typically accepts commands from a user and obtains data and services by sending requests to server applications running on the server computers. A number of protocols are used to exchange commands and data between computers connected to the Internet. The protocols include the File Transfer Protocol (FTP), the Hyper Text Transfer Protocol (HTTP), the Simple Mail Transfer Protocol (SMTP), and the Gopher document protocol. The HTTP protocol is used to access data on the World Wide Web, often referred to as "the Web." The Web is an information service on the Internet providing documents and links between documents. It is made up of numerous Web sites located around the world that maintain and distribute electronic documents. A Web site may use one or more Web server computers that store and distribute documents in a number of formats, including the Hyper Text Markup Language (HTML). An HTML document includes text and metadata (commands providing formatting information), as well as embedded links that reference other data or documents. The referenced documents may represent text, graphics, or video. In addition, HTML documents may contain client scripts (e.g. Java Script or Visual Basic Script) that are executed on the browser. The browser executes these scripts in a scripting space. A script is a set of instructions that are executed at certain times, e.g. when a Web page is loading, when a Web page is done loading, when the user has clicked on a link, when an event has occurred, etc.

An intranet is a local area network containing Web servers and client computers operating in a manner similar to the World Wide Web described above. Typically, all of the computers on an intranet are contained within a company or organization.

A client computer connected to a network, such as a local area network, wide area network, an intranet, or the Internet, can download digital information from server computers. This digital information can be presented to a user with and executed by a Web browser.

A Web browser is a client application or, preferably, an integrated operating system utility that communicates with server computers via FTP, HTTP and Gopher protocols. Web browsers receive content from a server sent over the Internet that is typically encoded in Hyper Text Markup Language (HTML) and executed by the browser on a client computer. Such HTML documents may include scripts (e.g. Java Scripts or Visual Basic Scripts) that allow for some basic flexibility. To go beyond what is possible with HTML and embedded scripts, browsers typically support the usage of additional components such as Java Applets, ActiveX Controls and Plug-Ins that provide extra functionality. These additional components, referred to as "client bits," are typically stored as executables in the memory of the client computer, and can be installed onto the client computer directly from a storage medium or downloaded from a server over the Internet. The functional components such as Java Applets, ActiveX Controls and Plug-Ins are mapped as objects into the script so that actions, methods or properties of an object can be called therefrom. (ActiveX Controls are reusable software components that incorporate ActiveX technology, which enables software applications to interact with one another in a networked environment regardless of the language in which the components were created. ActiveX Controls can be embedded in Web pages to produce animation and other multimedia effects, interactive objects and sophisticated applications. ActiveX Controls can be written in a variety of programming languages, including C, C++, Visual Basic and Java. A Plug-In, on the other hand, is a software component designed to plug into the Netscape Navigator browser, and to permit the browser to access and execute files embedded in HTML documents that are in formats the browser normally would not recognize.) Objects in this context are, e.g., dual-interface COM objects, which can communicate bi-directionally. From script, methods can be called, properties can be accessed and properties can be set. From the object, events can be sent to the browser scripting space to an event handler.

Also, Web browsers have an associated scripting space, which is memory space allocated for a browser instance, for the reception of electronic data called a script. Web browsers typically receive scripts as part of HTML documents from the network and execute them in their scripting space and execute instructions contained in the script. HTML content is typically information that is displayed to the user, and the scripting space can contribute to such content. Such content can be presented to a user, usually by way of an output device such as a computer monitor. In addition, the script may contain mappings to objects such as Active X Controls, Java Applets, Plug-Ins, etc. stored in the memory of a client computer and instructions for interaction with or communication to and from those objects. A script might contain additional instructions that allow an exchange between script instructions in a scripting space and objects that are mapped into the scripting space. In these cases, a mapping to the Plug-In object or ActiveX control object is contained in the script, and the Plug-In or ActiveX control performs some operation towards carrying out the script instruction.

For example, in a typical Web scenario, a Web browser receives an HTML document with an embedded script or scripts, wherein an embedded script uses an object to carry out additional functionality that can not be performed with HTML and the embedded script alone. The browser starts executing the script and maps the object into its scripting space. After that, the script can call methods of, read properties of or write properties to the object mapped into the scripting space. Currently, when the script is loaded and executed in the scripting space, instructions for an object are preceded by creating the object in the memory of the client computer. After that, the exchange of information (in the form of the script calling methods or accessing properties of the object, or in form of the object sending events to the scripting space) between the scripting space and the object is possible. When a user navigates to a new Web page, however, the object is disconnected from the scripting space and destroyed, and any state that was acquired during the lifetime of the object is lost. In addition, the scripting space itself is initialized again to get ready for the next request.

A problem thus arises when subsequent or additional scripting spaces try using the object, because the object has been destroyed and needs to be re-created. The problem is compounded when the object needs to accumulate some state before it is operational e.g., when connection to a server is required, when initialization procedures consume too much time, power or bandwidth, when user authentication via password is required, etc. A common scenario in which these problem(s) are evident occurs when a user navigates away from a Web page that uses an object as described above, and after a short time returns to that same Web page. With prior browser infrastructure, the object is re-created, and re-initialized with any state that is required for its execution, as described above. The same is true when a user creates a second or additional browser instance for the display of the same Web page address. The second or additional browser instance has a different scripting space that receives the same script. The second or additional browser instance could be in an entirely different browser application (different brand browser) or in a different instance of the same browser application. In either case, it is desirable for the script of the additional browser instance to map the exact same object that is used by the other browser instance into its scripting space, since initialization is costly. Alternatively, if a link to another Web page is input by the user via a computer input device, another Web page is displayed with a different script that may have instructions pertaining to the previously used object. Once again, the object needs to be re-created the first time it is encountered in the new script because it was previously destroyed and the browser has no notion or memory of any previously or currently existing instances of the object. It would thus be advantageous to provide a framework or infrastructure that overcomes these problems, and wherein the framework allows multiple scripting spaces of multiple browser instances to have access to and communication with objects, and wherein objects can retain state across multiple browser instances.

Stated differently, a problem with existing browser infrastructure is that every time a new scripting space receives a script with a mapping to objects that were created previously, these objects have to be created anew for the new scripting space. This can constitute inefficient use of computing resources, particularly for objects that undergo frequent or multiple information exchange with browser scripting spaces, or for objects that have expensive initialization steps associated therewith, as described above. In addition, the user experience may suffer if an initialization step requires user input, e.g., supplying passwords, etc. Thus, it would be advantageous to provide an infrastructure whereby such objects persist across Web pages, thus avoiding destruction and re-creation of objects.

At the core of an infrastructure that could achieve these advantages would be a service manager that can create and maintain communication with objects so that information relating to these objects can persist across different browser Web pages. These objects are called "services" in connection with the service manager since, in contrast to current browser infrastructure, objects of a service manager infrastructure are browser independent and are not mapped directly into the browser's scripting space. Since the services are browser independent and they exist in relation to the service manager, the services would be capable of being used by any application that can interface with the service manager.

SUMMARY OF THE INVENTION

A service manager for managing services and objects called by browser scripts is employed. The Web browser script is not in direct communication with the service manager; instead, a connector object is mapped by the script into the scripting space. For function calls that the script would previously make to the service or object directly, the script makes a call to a connector object. Depending on the browser brand, the connector object is of a different format e.g., an ActiveX control or a Plug-In. The first time such a connector object is created and mapped into a scripting space, the service manager is initiated and all of the services and objects that are managed by the service manager are loaded. The connector object packages the function call to a service for interpretation by the service manager. A script wrapper is a small object between the scripting space and the connector object, and allows script to be written without regard to different browser brands. The service manager, when receiving a packaged service call from a connector object, forwards the service call to the corresponding service or object within its control. The service then performs according to the call and information can flow back to the script via the service manager and connector object e.g., an ActiveX control interface or Plug-In interface. Services managed by the service manager can also send information regarding events to the scripting space by way of the service manager, the connector object, and the script wrapper. An event handler can be implemented by the script author if the event is of interest to the script. As a result, the destruction and re-creation of objects that typically occurs when objects are mapped directly into the scripting space are avoided. All that is destroyed and re-created are the communication channels (namely the connector object and the script wrapper) between the scripting space and the services that are managed by the service manager. This allows any state within the service to persist across different Web pages, thereby improving users' browsing experience. Other features of the present invention are described below.

DETAILED DESCRIPTION OF THE DRAWINGS

The technique for managing client services across browser Web pages is further described with reference to the accompanying drawings in which.

DETAILED DESCRIPTION OF PREFERRED EMBODIMENTS

Overview

Figure 1:
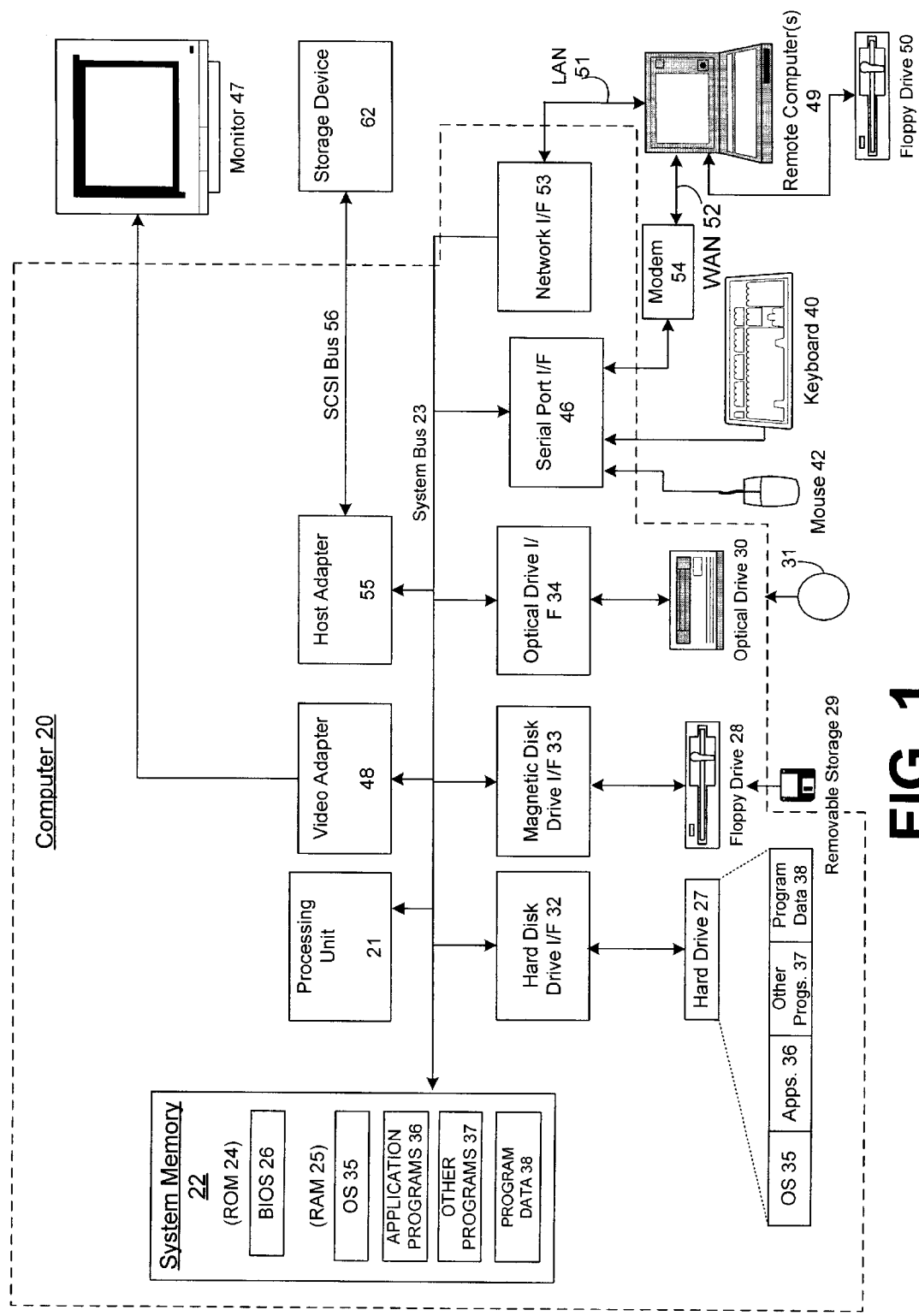
FIG. 1 is a block diagram representing a general purpose computer system in which aspects of the present invention may be incorporated.

As discussed above, the present invention was developed in part to provide an improved, computer-based system for managing services exposed to the scripting space of a Web browser. It is undesirable for these objects to be destroyed and re-created from Web page to Web page since e.g., objects can have state that is lost when the object is destroyed, and initialization procedures can be costly. Thus, the present invention provides an improved infrastructure that employs a service manager for managing services for different Web browser pages. A preferred implementation of the present invention provides a service manager that loads services that are independent of the scripting space. As long as the service manager is running, all services remain viable, and they are not destroyed or re-created. Whenever a scripting space makes a function call to access a service, a communication channel is opened between the scripting space and the service manager. This communication channel is achieved by a connector object that is mapped into the scripting space. The connector object is a stateless object that only packages and forwards requests to the service manager. Although the connector object is destroyed and re-created whenever the user browses away from a Web page, this is not deleterious since the services are maintained by the service manager. From the script's point of view, the services managed by the service manager preserve any state that they have, i.e. these services persist across Web pages for use by different scripts. To clarify further, the very same instance of a service, namely one that the service manager manages as part of its infrastructure, is used for all scripts making requests to the given service. Services thus survive the destruction and re-creation of scripting spaces and connector objects.

The service manager is an out-of-process COM server that is started the first time a connector object is mapped into the scripting space and persists for a certain amount of time afterwards. The service manager loads and manages predetermined services that are contained on a client computer. A connector object is mapped into the scripting space and establishes a communication channel between the scripting space and the service manager. The service manager communicates with script in the scripting space having mappings to services via mappings to a connector object (either an ActiveX control interface or a Plug-In interface, depending on browser brand). The ActiveX control interface or Plug-In interface referenced in the script by the mappings thereto is responsible for opening the connection to the service manager for subsequent performance by the service. A script file is downloaded from a server to each Web page and the script file may use the services managed by the service manager without re-creating the services. A script wrapper is employed allowing the same script to work for multiple browser applications (different brands).

If a part of the script in the scripting space has a mapping to the connector object (which is either an ActiveX control interface or Plug-In interface, depending on browser brand) and a call to an object or service is made in the script, the connector object (either an ActiveX control interface or Plug-In interface, depending on browser brand) translates the call into a form recognized by the service manager, and sends the call to the service manager. If the service manager does not yet exist, the service manager is created and the service manager loads the objects or services that are pre-registered therewith into its infrastructure. If the service manager has been created, then the service manager gates the call to the called service. If information is to return from the service to the scripting space, that information is channeled back to the scripting space via the service manager the connector object, and script wrapper. Thus, the script in the scripting space can interact with services via the script wrapper, the connector object and service manager. When a browser instance goes away or is exited, only the connector object is destroyed and re-created, if the browser returns to a Web page that uses the services. Thus, for subsequent browser instances or different browsers, future calls to the previous instance of the service from the scripting space can be made. Also, events from the service to the scripting space can be forwarded by the service manager via the connector object (and script wrapper) to an event handler in the scripting space.

More preferably, the present invention relates to a service manager for use in Web browsers contained on a client computer connected to a server via the Internet. In a typical browser executing a script, if the script makes a call to the service, the service is created and the function call is performed, but the same instance of the service is not accessible to the other Web pages having function calls to that service. Thus, the service is re-created to serve function calls from other Web pages. A service manager, on the other hand, manages services apart from the browser and thus maintains communication channels to services for any number of different Web pages making functional calls to the services, where the same instance of each service is used for every web page.

The present invention addresses the shortcomings of the prior art in several ways. As mentioned above, a problem associated with the use of functional components such as Java Applets, ActiveX Controls, Plug-Ins and other services is that the object is created every time the client navigates to a Web page that uses the object, and the object is destroyed when the client navigates to another Web page. In other words, it is not possible for information relating to an object, such as the state of the object, to persist across pages in a browser or to persist across multiple browser instances or to persist across different browsers. The present invention addresses this problem by providing a service manager for managing the life-time of services and by providing a connector object, which is the interface between the browser scripting space and the service manager.

In addition, it is difficult and time consuming to create an object that will work in different browser brands because the interface to the scripting space is different from brand to brand. For example, for Netscape, a Netscape Plug-In needs to be developed, and for Microsoft's Internet Explorer, Active X controls are most common. Besides concentrating on the core functionality of a given object or service, the developer is also concerned with packaging it either as a Plug-In or Active X control. The present invention addresses this concern by providing two forms for the connector object: an Active X control to be used with Microsoft's IE, and a Plug-In to be used with Netscape's Navigator. The developer of services thus only needs to provide the service itself in form of a COM object without worrying about browser specific issues.

Thus, to improve the users' browsing experience, the present invention allows client objects and information relating thereto to persist across pages, browser instances and even different browsers. The present invention provides an infrastructure capable of managing new services, handling service upgrades and state changes for multiple browsers. A general notification mechanism is also built into the infrastructure that can forward events from services into the scripting space, e.g., to permit the objects to notify an event handler of relevant events, so that polling can be avoided. The present invention also allows the same script to be used for accessing objects when using different browser brands. The present invention also allows the same service to be used for different browser brands. The services are managed exclusively by the service manager and the connector objects deal with differences in browser brands. Thus, when a function call arrives at the service manager, all brand dependencies have been eliminated and the communication follows the standard COM format.

The present invention will now be explained in greater detail with reference to presently preferred embodiments thereof. First, a description of exemplary computer and network environments is provided, and then a detailed description of the service managing aspect of the invention is provided.

Computer Environment

FIG. 1 and the following discussion are intended to provide a brief general description of a suitable computing environment in which the invention may be implemented. Although not required, the invention will be described in the general context of computer-executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the personal computer 20. Although the exemplary environment described herein employs a hard disk, a removable magnetic disk 29, and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner, or the like. These and other input devices are often connected to the processing unit 21 through a serial port interface 46 that is coupled to the system bus, but may be connected by other interfaces, such as a parallel port, game port, or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Network Environment

Figure 2:
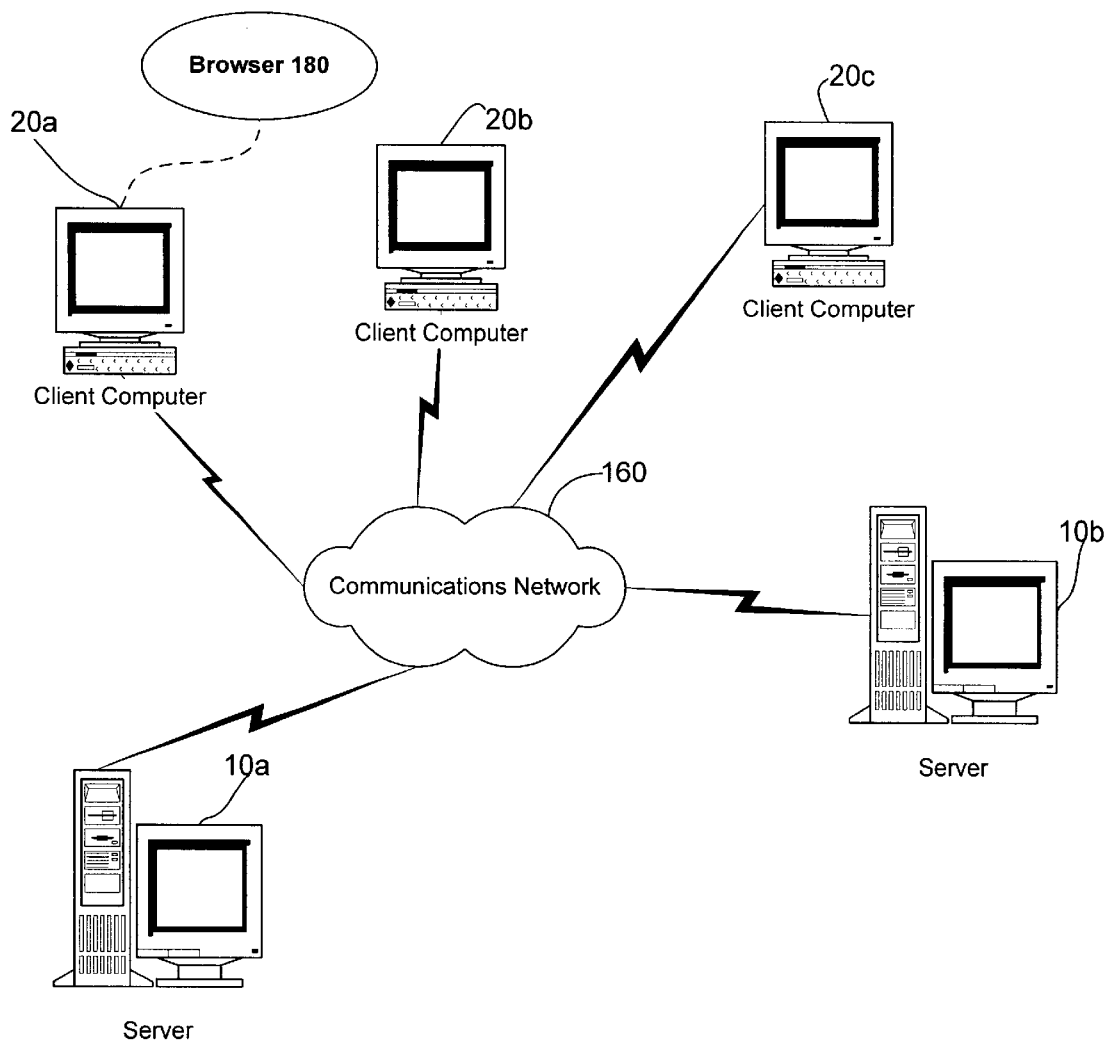
FIG. 2 is a block diagram representing an exemplary network environment with a server in accordance with the present invention.

As noted, the computer described above can be deployed as part of a computer network. In general, the above description applies to both server computers and client computers deployed in a network environment. FIG. 2 illustrates an exemplary network environment, with a server in communication with client computers via a network, in which the present invention may be employed. As shown in FIG. 2, a number of servers 10a, 10b, etc., are interconnected via a communications network 160 (which may be a LAN, WAN, intranet or the Internet) with a number of client computers 20a, 20b, 20c, etc. In a network environment in which the communications network 160 is the Internet, for example, the servers 10 can be Web servers with which the clients 20 communicate via any of a number of known protocols such as hypertext transfer protocol (HTTP). Each client computer 20 can be equipped with a browser 180 to gain access to the servers 10.

Thus, the present invention can be utilized in a computer network environment having client computers for accessing and interacting with the network and a server computer for interacting with client computers. However, the service managing process of the present invention can be implemented with a variety of network-based architectures, and thus should not be limited to the example shown. The present invention will now be described in more detail with reference to a presently preferred implementation.

Service Managing Across Different Web Pages

The present invention is directed to a service manager for managing services and objects called by browser scripts. When a service is to be called from a Web browser script, a connector object is loaded by the script and mapped into the scripting space, and the service managing process is initiated. All of the services and objects that are managed by the service manager are loaded. The connector object (which is an ActiveX control interface or Plug-In interface) packages a service function call for interpretation by the service manager. A script wrapper allows script to be written without regard to different browser brands. The service manager then forwards the service call to the corresponding service within its control. The service then performs according to the call and information can flow back to the script via the service manager, connector object (ActiveX control interface or Plug-In interface), and script wrapper. Services managed by the service manager can also send information regarding events to the scripting space by way of the service manager and an event handler. The main task of the connector object is to translate scripting engine specific aspects of the call, e.g. arguments, into the standard used by COM.

Figure 3:
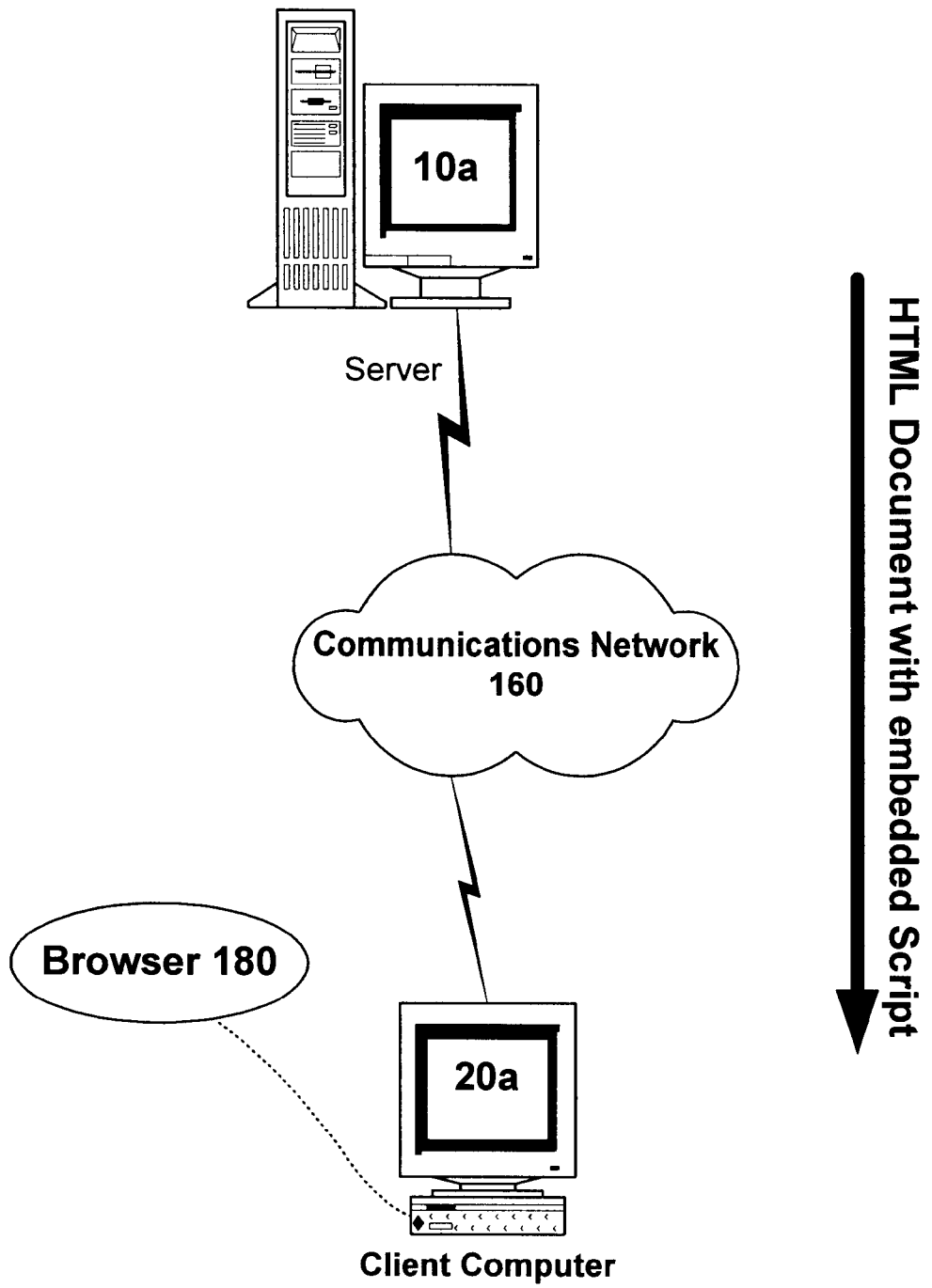
FIG. 3 is a block diagram of an HTML document with embedded script being transmitted from a server to a client computer in accordance with the present invention.

FIG. 3 shows an HTML doc with embedded script transmitted from a server computer 10a to a client computer 20a over a communications network 160. When a user requests a Web page, a script corresponding to that Web page, consisting of electronic data and instructions, is transmitted to the client computer 20a. The browser 180 of the client computer 20a then executes the instructions contained in the script.

Figure 4:
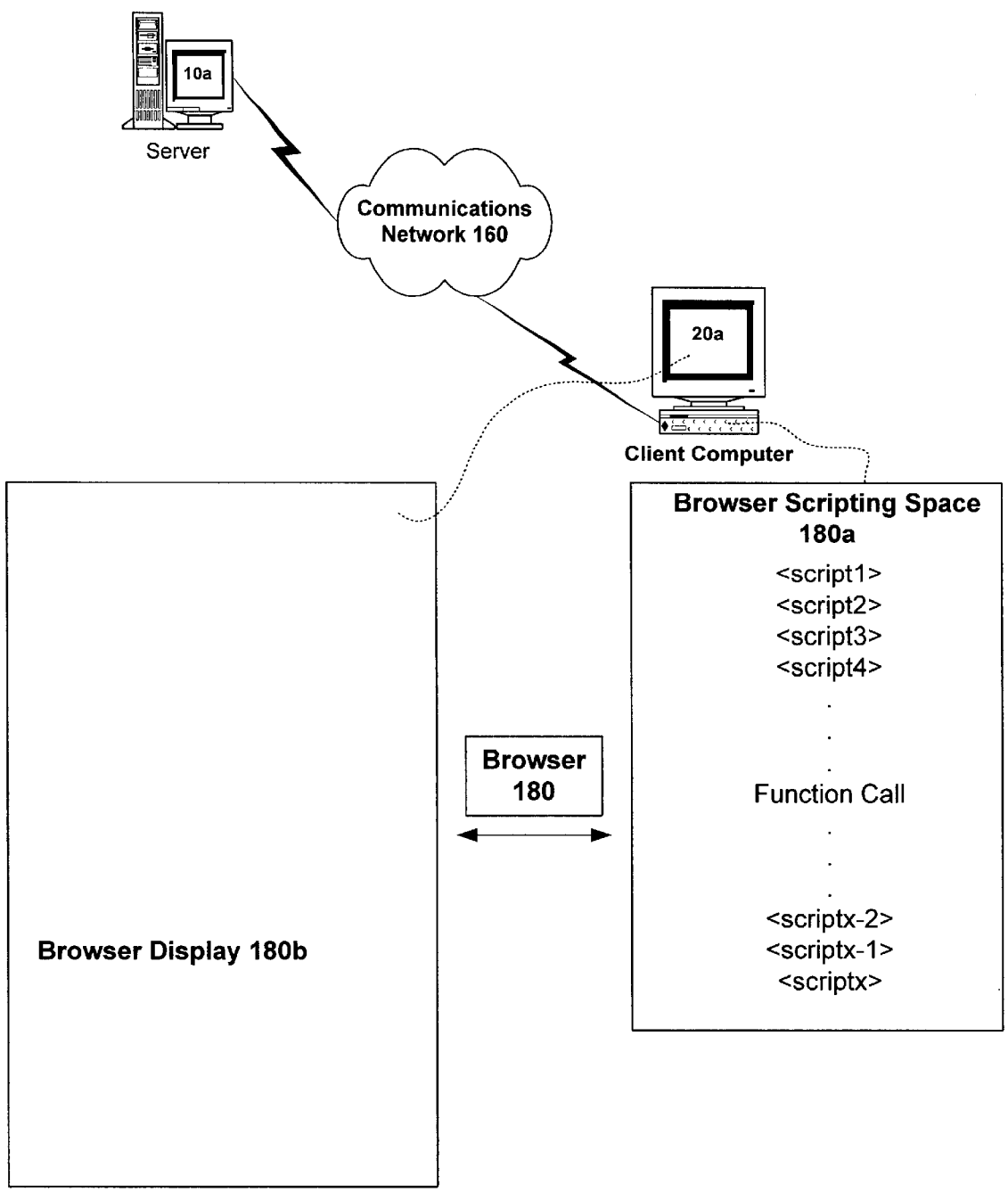
FIG. 4 is a block diagram of a browser executing a script in accordance with the present invention.

FIG. 4 is a block diagram of a browser executing a script. The script from the server computer is received into the memory of the client computer 180a, wherein <script1> through <scriptx> represent a script, having script instructions or other script code. The location in memory and amount of memory used for a script generally changes from script to script, but conceptually, memory used for the storage of scripting data can be thought of as the browser's scripting space 180a. The browser 180 then executes the instructions contained in the script. A browser 180 also has a browser display 180b for presentation of information to a user in accordance with the script.

Figure 5:
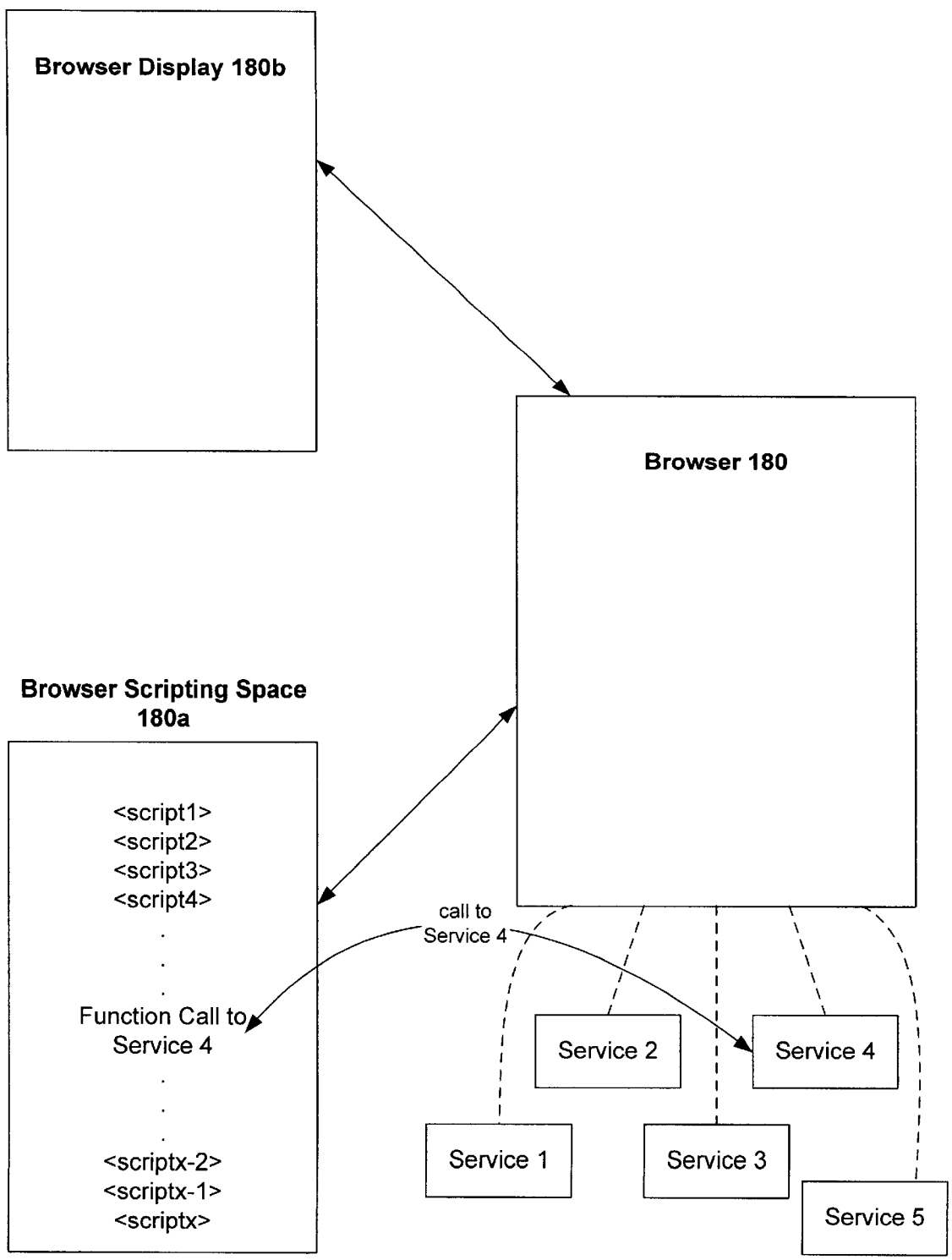
FIG. 5 is a block diagram of an execution of a script without a service manager.

FIG. 5 is a block diagram of an execution of a script without a service manager. When a browser comes to a place in a script where a function is called beyond the scope of the functionality of the browser, an additional object or service is called for completion of that portion of the script. Thus, in the example of FIG. 5, when a function call is made to service 4, the browser creates the service in order to carry out the function call. For example, if service 4 is a dictionary service for spell checking words, browser 180 starts the dictionary service if the client bits for the dictionary service are located on the client computer. The dictionary service then performs an operation. If there is information to be returned to the scripting space, the browser 180 is the interface for sending the information to the scripting space. This process repeats for each service called in the script. Depending on browser brand, the COM event model is either supported (e.g., for Internet Explorer), or not supported (e.g., for Netscape Navigator, which has an event model that is incompatible with the COM standard). A browser brand not supporting the COM event model makes event handling difficult, and if a service event is important, the script may contain instructions to poll the service for the happening of the event. Also, whenever a new script is received in the scripting space 180a, information relating to the services is lost and the services must be re-created and called again in the manner explained above. This is especially undesirable if the computing costs for creating the service are high. With respect to a dictionary service, for instance, a spell checking service may require that a dictionary must be loaded, which would occur every time the service is re-created. Thus, as noted previously, script execution by a browser without use of a service manager can constitute inefficient use of computing resources.

Figure 6A:
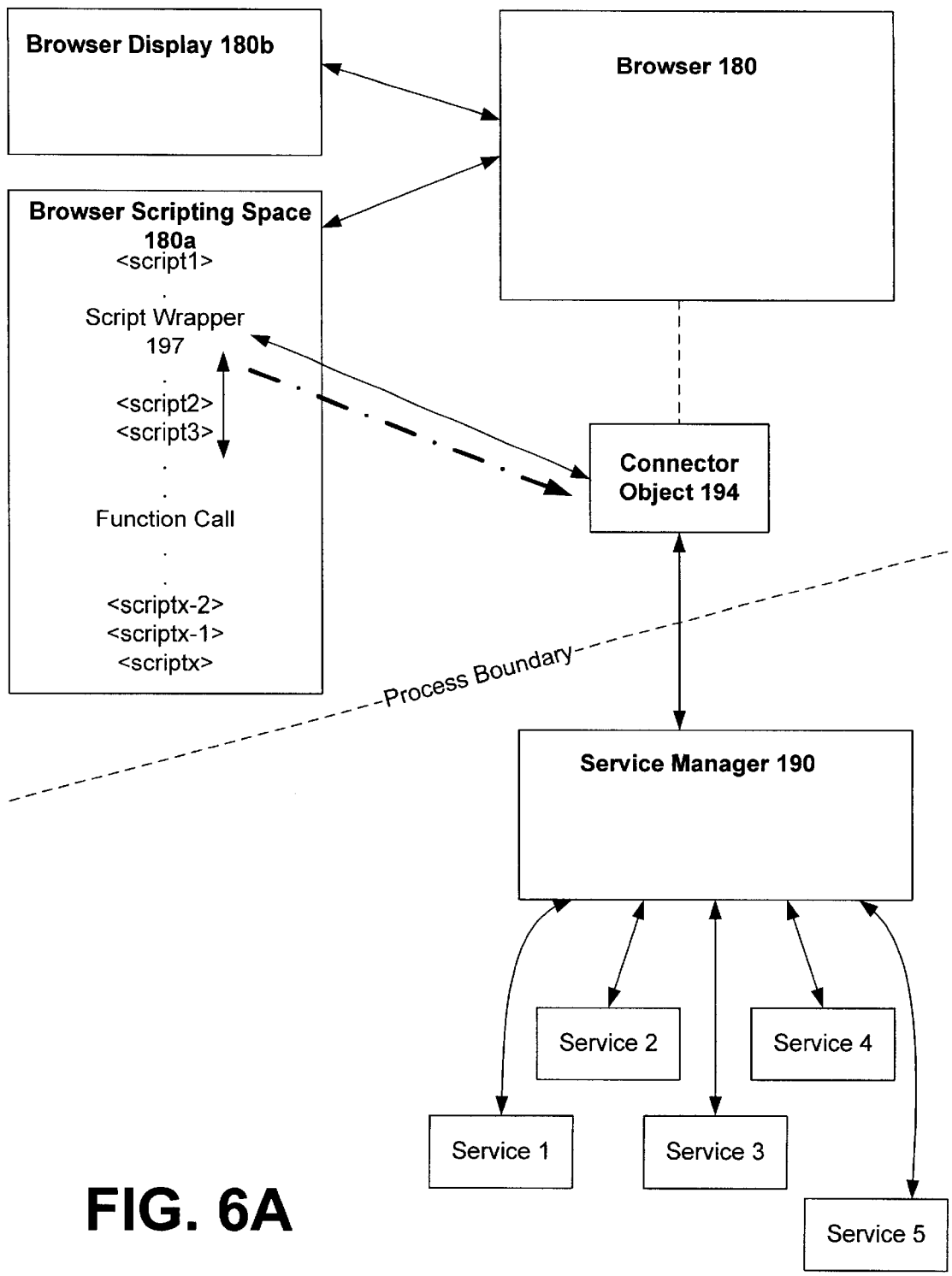
FIG. 6A is a block diagram of an execution of a script with a service manager in accordance with the present invention.

FIG. 6A shows a block diagram of an execution of a script with a service manager in accordance with the present invention. Service manager 190 is an application on the client computer that acts in connection with the browser 180. However, to achieve persistence of objects mapped into a browser's scripting space, the lifetime of the object needs to be made independent of the lifetime of the scripting space; otherwise the object would be destroyed when the scripting space is destroyed. The service manager satisfies this need by existing independently. Service manager 190 is an executable, such as an out-of-process COM server. The connector object 194 can be a DLL (dynamic link library) file or the like. As an out-of-process COM server, the service manager runs in its own process, but can communicate with the connector object via COM. A benefit of placing the service manager into its own process is that if something fails in one of the services (e.g. it crashes), the browser will continue to execute as usual. Since the services are loaded into the service manager, they run in the service manager's process space, and not the browser's process space. The service manager 190 is thus independent of the browser 180. In effect, the service manager 190 module can be modified without affecting the execution of browser 180 because it is independent, but the browser 180 can nonetheless interface with the service manager 190 through the connector object 194 and COM protocol. The dotted line denotes the division between the browser 180 process and the service manager 190 process.

In a preferred embodiment, service manager 190 has a set of services that are pre-registered as associated with the service manager 190. In FIG. 6A, five services are shown as being associated with the service manager 190. The service manager 190 has mappings to the client bits that correspond to the services so that at startup, the service manager 190 can load the services into the service manager 190. Thus, subsequently, when services are called, the services do not need to be re-created, but rather the services persist as long as the service manager 190 persists. Further, the service manager 190 is not started or loaded until the first service request is made from a scripting space 180a, and the service manager 190 and its services persist for a predetermined time, such as a half hour, after startup.

A browser 180 executes a script (<script1> through <scriptx>) in scripting space 180a. As in the previous example, browser 180 comes to a place in a script where a function is called beyond the scope of the functionality of the browser. If it is functionality associated with a service or object pre-registered with the service manager 190, then the service manager 190 is called upon to handle the service or object. If the service manager 190 is not yet loaded, the service manager 190 and the services are loaded. In FIG. 6A, when a function call is made to service 4, service 4 is a service known to be in the control of the service manager 190 and thus service manager 190 handles the service call via an ActiveX control interface or a Plug-In interface. The service manager 190, having loaded at startup the appropriate client bits having the services or objects pre-registered with the service manager 190, receives the service call from the script via a script wrapper 197 and a connector object 194, which can be, e.g., an ActiveX control interface or a Plug-In interface. For example, if service 4 is a dictionary service for spell checking words, connector object 194 packages the request for the dictionary service 4 into a format that the service manager 190 recognizes. As part of the call, the service that is to be used needs to be indicated by the script. Thus, the service manager 190 has sufficient information to gate the call to the correct service. A function call to the service manager 190 directly from the script would not be possible for all browser brands, as the format of the request may be unrecognizable by the service manager 190. Thus, the connector object 194 restructures the request into a format recognized by the service manager 190.

Connector object 194 then sends the service request to service manager 190. Service manager 190 communicates the service request to the dictionary service 4. Service 4 performs an operation, returns information and/or the like. From the scripting space, there are generally three types of operations that are useful in terms of using a service: A parameter of the service can be set by sending the parameter, information can be requested of the service, and the service can be asked to perform an operation. Thus, once the service call is made, it is clear that information can flow in either direction through the service manager 190 and the connector object 194 between the service and the scripting space 180a. Also, multiple types of service requests can be made as part of one request.

In the present example using a dictionary service 4 making a spell check, a service request is made from the scripting space with a word to be spell checked. The connector object 194 packages the request so that the service manager 190 can make the request. The service manager 190 makes the request to service 4, service 4 performs a spell check operation, and information regarding the correctness of the spelling and perhaps additional information is sent back to the scripting space via service manager 190 and connector object 194. In the case of the return of information, connector object 194 packages information returned from the service manager 190 into a format recognizable by the script call from where the original service request was made. This process would repeat for other types of service calls from the script.

Figure 6B:
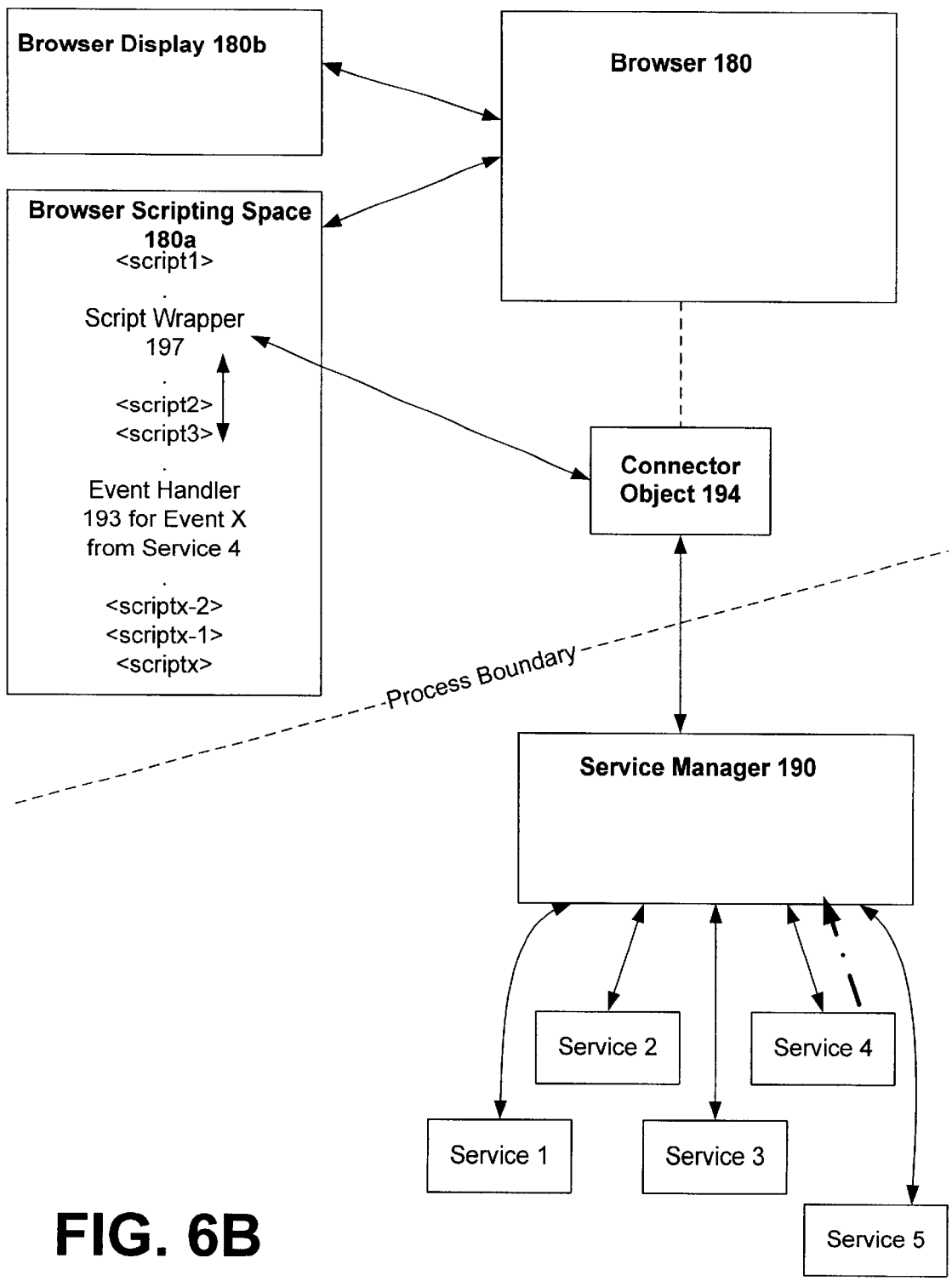
FIG. 6B is a block diagram of event handling from a service in accordance with the present invention.

FIG. 6B is a block diagram of event handling from a service in accordance with the present invention. Depending on browser brand, it can be difficult to notify the scripting space of events. As noted previously, one browser brand may support the COM event model, while another browser brand may support an event model that is incompatible with the COM standard. It is time consuming and difficult to correctly implement the forwarding and handling of events for a browser brand having an event model that is incompatible with the COM standard. For a browser brand having an event model that is incompatible with the COM standard, for a service event, it may be easier to write a script whereby the script polls the service for the happening of the event. This involves repeatedly making requests to determine if an event has occurred and can be wasteful of processing resources. However, in accordance with the present invention, a brand independent event handler 193 handles service event occurrences. As shown in FIG. 6B, if the service manager detects the occurrence of an event, the event can be sent to the scripting space 180a to alert the script that the event has occurred. This would occur when certain conditions present in the service have been met. For example, for a document handling service, whether or not a certain document has changed can be an important event. Upon the changing of the document, the conditions for that event are evident to the service manager 190, which forwards the event to connector object 194. The connector object 194 receives event information according to the COM standard and converts it into browser specific event information (e.g. for a browser brand having an event model that is incompatible with the COM standard). The script wrapper 197 then eliminates any browser specific issues (which happens in event handler 193a for browser brand1 or 193b for browser brand2) so that the event can be forwarded and further handled by the brand independent event handler 193. Then, event handler 193 interacts with the script in the scripting space 180a so that the event information is conveyed and handled correctly.

With the service manager, whenever a new script is received in the scripting space 180a, information relating to the services is not lost and the services need not be created again. This is because the service manager 190 persists across Web pages as do the services that are within its management profile. Thus, script execution by a browser with a service manager advantageously permits service state information to be ascertained across and from different Web pages, eliminates the need to recreate objects and services, and increases efficient use of computing resources, and/or result in an improved browser experience.

Figure 7A:
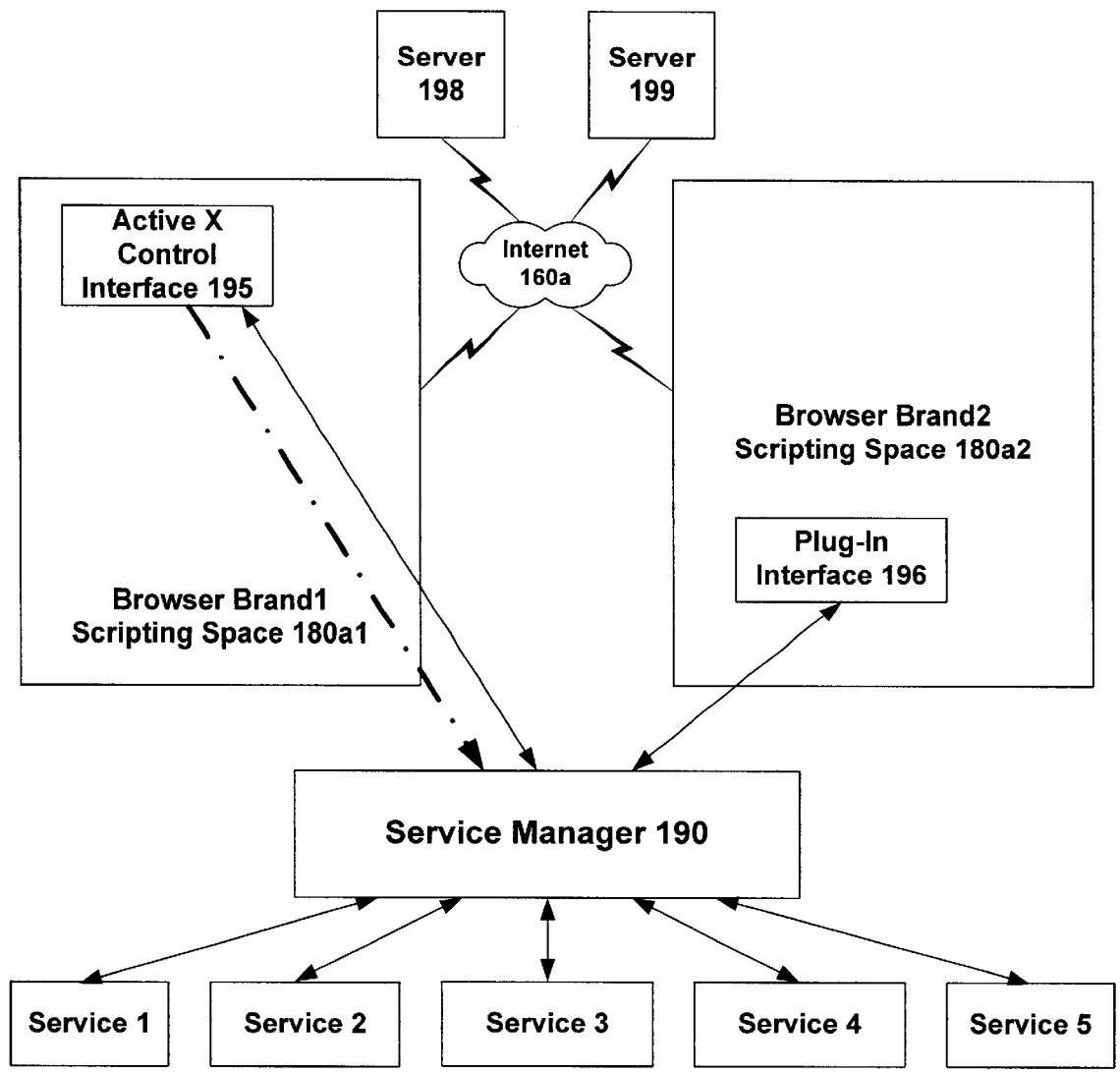
FIG. 7A is a block diagram illustrating service requests in the context of different browser brands in accordance with the present invention.

FIG. 7A is a block diagram wherein different browser brands are connected to the Internet 160a with access to different servers, such as server 198 and server 199. As mentioned from scripting space 180a1 or scripting space 180a2, different types of service requests can be made: A parameter of the service can be set by sending the parameter, information can be requested of the service, and the service can be asked to perform an operation. In FIG. 7A, the dotted line represents such a service request after ActiveX control interface 195 (which is the connector object 194 for browser brand1) has packaged the service request from the script in the scripting space 180a1. Once the call is made, however, information can flow in either direction, since multiple information flow and/or operations could be used to complete a service request. Also, multiple services could be used to complete an operation. The main point is that once the service request is made from the scripting space, information can flow bi-directionally between the services and scripting space.

FIG. 7A also illustrates that when different browser brands are used, scripting protocols are different. Generally, when different sets of developers independently design a browser, the formats for interaction between the browser and the scripting space may vary. Thus, the interface for communication between the service manager 190 and the scripting space also varies for different browser brands. In other words, the connector object 194 may be implemented differently for each browser brand. For example, an ActiveX control interface 195 may be written for interaction between browser brand1 scripting space 180a1 and the service manager 190 and a Plug-In interface 196 may be written for interaction between browser brand2 scripting space 180a2 and the service manager 190.

Figure 7B:
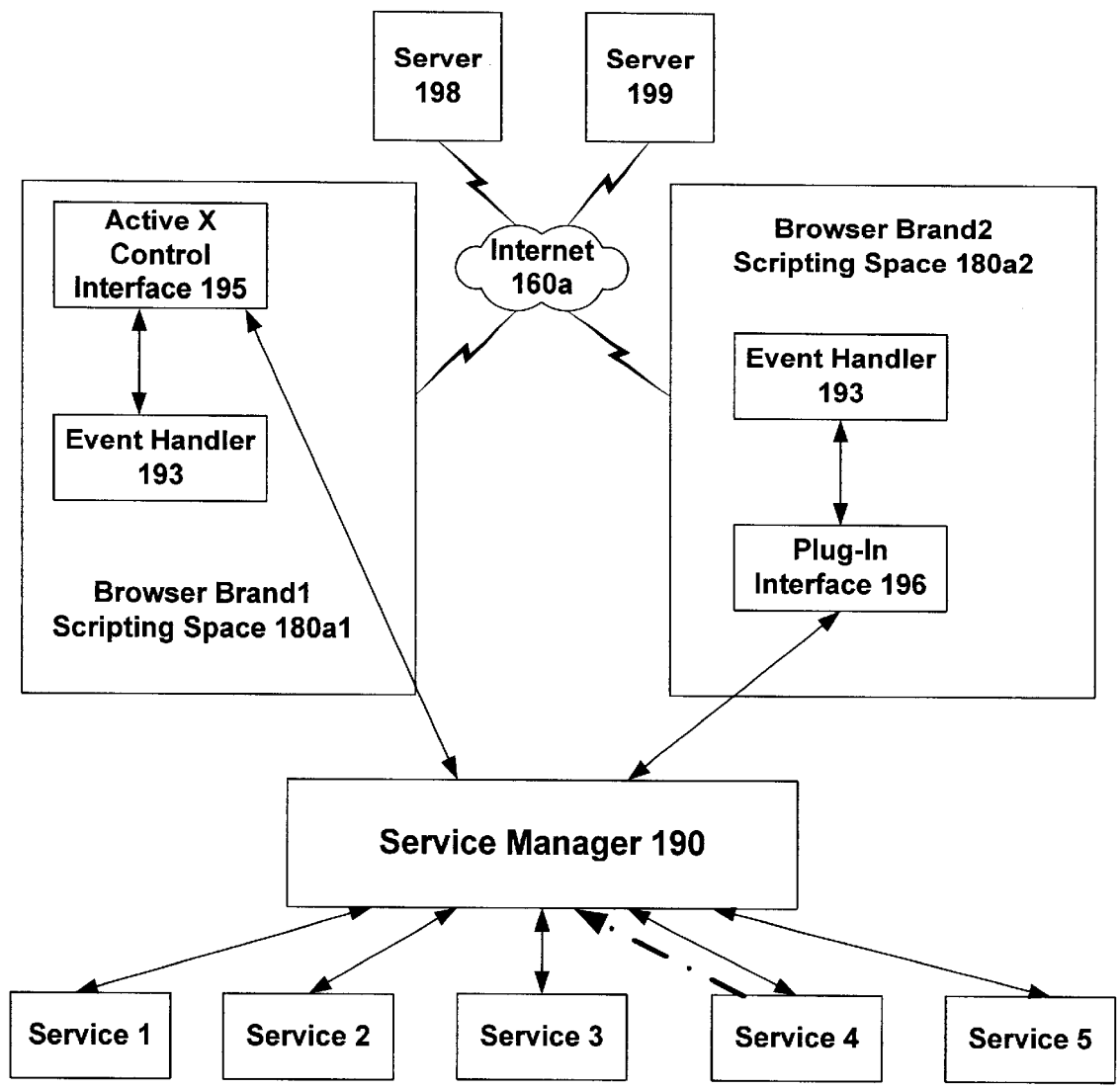
FIG. 7B is a block diagram illustrating event handling in the context of different browser brands in accordance with the present invention.

FIG. 7B is another block diagram illustrating the present invention in the context of different browser brands. In this case, it is the occurrence of the event that begins the flow of information. As shown by the dotted line, when an event happens in service 4, the event information is recognized by the service manager 190. As described before, the service manager 190 forwards the event information to the appropriate interfaces 195 and 196 and event handlers 193a and 193b, thus ensuring that the script has access to the event information. As in FIG. 7A, information can flow bi-directionally. Although the occurrence of the event at the service begins the process, information can flow in either direction between the services and scripting spaces thereafter in order to take any necessary steps in response to the occurrence of the event.

Figure 8A:
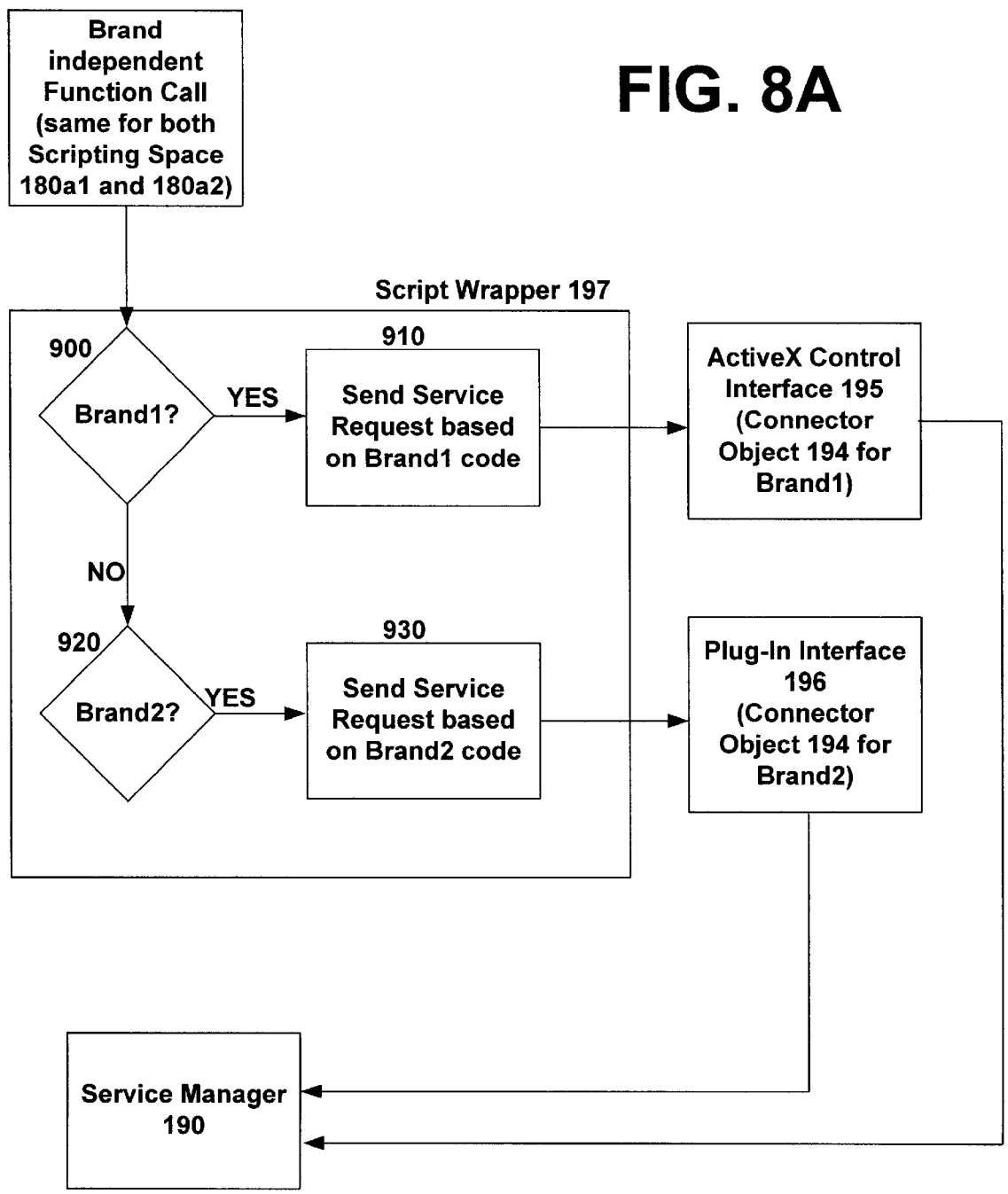
FIG. 8A is a block diagram illustrating the operation of a script wrapper in the context of a service request in accordance with the present invention.

FIG. 8A is a block diagram illustrating the operation of a script wrapper 197 (shown in FIGS. 6A and 6B) as used in the present invention. The script wrapper 197 is a set of scripting instructions, e.g. Java Script. These scripting instructions can either be embedded in the original HTML document that is downloaded to the browser, or they can be provided inside a separate file that is referenced by the script that is embedded in the HTML document. If the scripting instructions are provided as a separate file, the browser downloads that file, but then treats the script as if it had been embedded in the original HTML document. In a preferred implementation, the script wrapper 197 is provided as a separate file, and thus the browser downloads the set of scripting instructions contained in the script wrapper 197 and incorporates them into the script as if originally embedded in the HTML document. The script wrapper 197 provides a set of function calls to the scripting space, and if such a function is called, it forwards it to either the Active X control interface 195 (the connector object 194 for brand1) or the Netscape Plug-In interface 196 (the connector object 194 for brand2), depending on browser brand.

The script wrapper 197 is also used for events. For events, the script wrapper 197 determines whether an event handler 193a or 193b (depending on browser brand) for the given event exists, and if it does, the script wrapper 197 communicates the event to the event handler. This is to ensure that the same script can be written for different browser brands FIG. 8A is a block diagram of a service request used with a script wrapper 197. In a preferred embodiment, the script wrapper 197 recognizes which browser brand is being used (e.g., using IF THEN ELSE, CASE, SWITCH and like logic statements) and sends a service request formatted properly for the browser brand being used. Thus, when a function call is made from a scripting space 180a1 or 180a2, for example, at 900, a determination is made as to whether the request came from a browser brand 1, such that the scripting space would be interfacing with the service manager 190 via an ActiveX control interface 195. If so, the request is sent at 910 to the ActiveX control Interface 195 (connector object 194) based on Brand1 formatting, and the ActiveX control Interface 195 packages the call and forwards it to service manager 190. If not, at 920, a determination is made as to whether the request came from a browser brand2, such that the scripting space would be interfacing with the service manager 190 via a Plug-In interface 196. If so, the request is sent at 930 to the Plug-In interface 196 (connector object 194) based on Brand2 formatting, and the Plug-In interface 196 packages the call and forwards it to service manager 190. Although two browser brands are shown, a script wrapper 197 can be written to handle any number of browser brands and corresponding protocols, as long as a given browser brand supports the basic concept of script interaction with external objects and the concept of forwarding events to the scripting space from external objects. The script wrapper 197 thus allows the author of the script to disregard the browser brand for which the script is written.

Figure 8B:
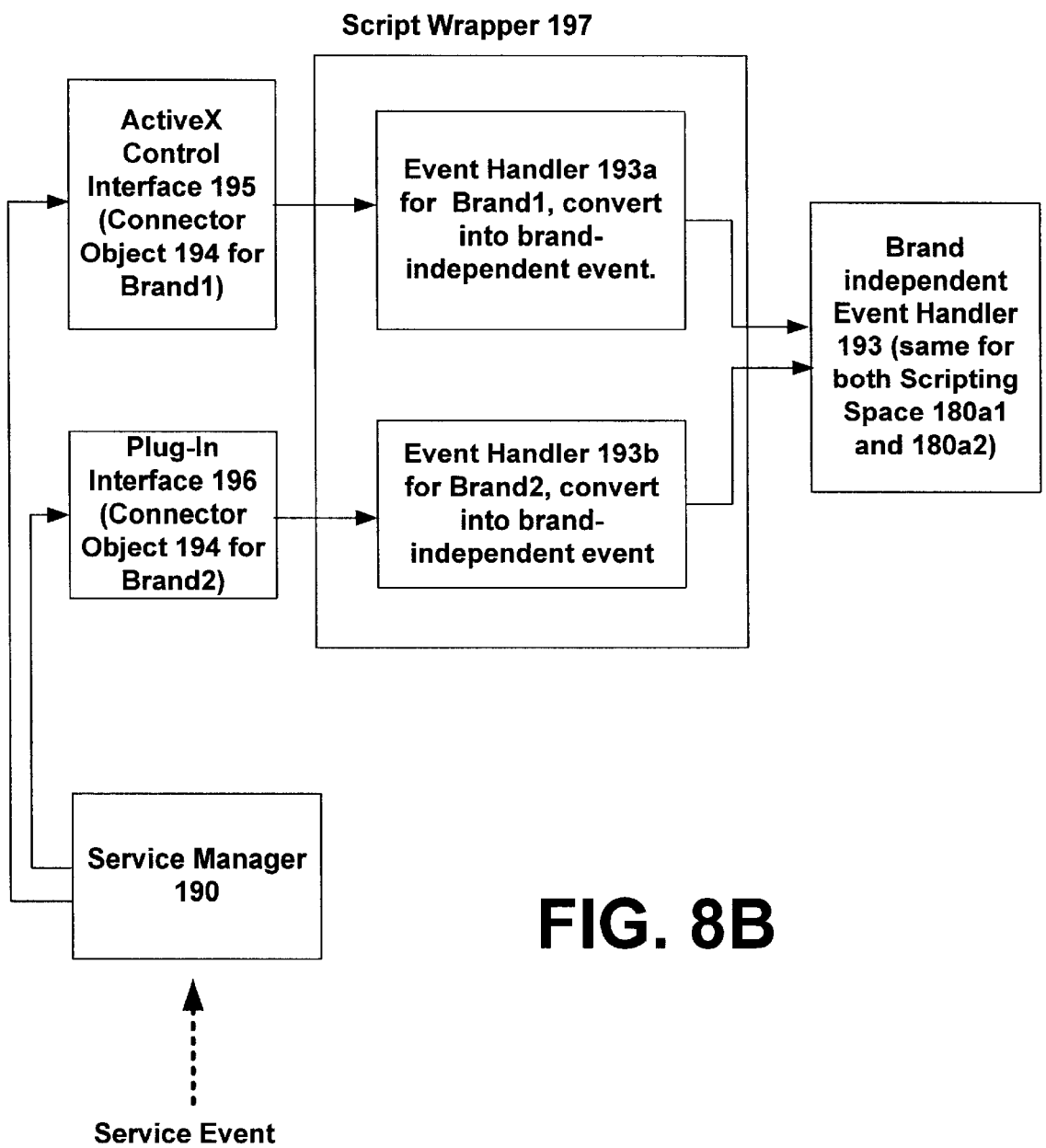
FIG. 8B is a block diagram illustrating the operation of a script wrapper in the context of a service event in accordance with the present invention

FIG. 8B is a block diagram of an occurrence of a service event wherein a script wrapper 197 is used. This figure shows that the script wrapper 197 works in the reverse direction as well i.e., from a service event to the event handlers. A service event is recognized by the service manager 190, when certain conditions are fulfilled. The service manager 190 then forwards the service event information to the connector objects 194 that are connected to the service manager at the time of the event. The connector object 194 is either an ActiveX control Interface 195 or Plug-In Interface 196, depending on browser brand. The script wrapper 197 then receives the event information differently depending upon whether the event information has come from an ActiveX control interface 195 (in which case event handler 193a for brand1 receives the event) or a Plug-In interface 196 (in which case event handler 193b for brand2 receives the event). Event handlers 193a and 193b convert the event information into a format such that it no longer matters which scripting space's (180a1 or 180a2) event handler 193 is to receive the event information. The event handler 193 is the same for both scripting spaces. In this fashion, the event information can be handled by the event handlers of the respective browser brands independently of browser brand. Although the example illustrates two browser brands, a script wrapper 197 can be written to handle events for any number of browser brands and corresponding protocols.

Hence, a service manager, interface and script wrapper are provided to form a communication line between the scripting space and the services. The service manager and interface act as a proxy, since the service manager and interface cause an action or actions to occur at the service on behalf of the scripting space. Instead of the script calling the service directly, this proxy is used, and the proxy is designed to be flexible to handle calling methods of the services, and setting and getting properties of the services. This proxy also works in the reverse direction by forwarding events from the services to the scripting space.

While the present invention has been described in connection with the preferred embodiments of the various figures, it is to be understood that other similar embodiments may be used or modifications and additions may be made to the described embodiment for performing the same function of the present invention without deviating therefrom. For example, although in a preferred embodiment the service manager and services are loaded the first time a service request is made and the service manager exists for a preset time, the service manager could be loaded at the startup of a Web browser instance or any other suitable time, and persist indefinitely. Additionally, while the present invention has been described with respect to two browser brands, the service manager, interface and script wrapper can be used with any number of browser brands. Therefore, the present invention should not be limited to any single embodiment, but rather construed in breadth and scope in accordance with the appended claims.

What is claimed is:

1. A method for managing services called by a browser script in a browser's scripting space, comprising the acts of:
   receiving a browser script in a scripting space of a browser of a client computer;
   loading a service manager in the client computer for managing services called by the browser script in the scripting space of the browser;
   loading, in the client computer, at least one service for communication with the service manager; and
   maintaining service-related information in memory of the client computer as one or more additional Web pages are received by the client computer.

2. A method as recited in claim 1, further comprising the act of creating a connector object for formatting a service request from the browser script and sending the formatted service request to the service manager.

3. A method as recited in claim 2, wherein the service manager receives a service request from the connector object and forwards such request to a service, matching the service request, of the at least one service.

4. A method as recited in claim 2, wherein the service manager is loaded in the client computer the first time the connector object attempts to send a formatted service request to the service manager.

5. A method as recited in claim 2, wherein a script wrapper is employed in the scripting space for gating service requests to different connector objects for different browser brands.

6. A method as recited in claim 5, wherein, for a first browser brand, the connector object is in the form of an ActiveX control interface and is provided to facilitate communication between the script of a Web page scripting space and the service manager.

7. A method as recited in claim 5, wherein, for a second browser brand, the connector object is in the form of a Plug-In interface and is provided to facilitate communication between the script of a Web page scripting space and the service manager.

8. A method as recited in claim 1, further comprising the act of creating a connector object for receiving event information from the service manager and sending the event information to an event handler in the scripting space.

9. A method as recited in claim 8, wherein the event information coming from the service manager is generated by the service manager when a parameter of at least one service matches at least one pre-determined criterion.

10. A method as recited in claim 1, wherein information maintained by the service(s) persists across multiple Web pages and different web pages end up using the previously used instance of a service.

11. A method as recited in claim 1, wherein the service-related information comprises a state of the service.

12. A method as recited in claim 1, wherein the service manager persists for a predetermined amount of time after startup of the service manager.

13. A method as recited in claim 1, wherein at least one service is pre-registered with and mapped to the service manager.

14. A method as recited in claim 1, wherein the service manager is loaded in the client computer when a browser is loaded in the client computer.

15. A method as recited in claim 1, wherein the service manager is loaded the first time a service request is made from a script.

16. A method as recited in claim 1, wherein the service manager receives service requests from Web pages via a connector object and forwards such requests to the at least one service, and receives event information from the at least one service and forwards the event information to the scripting space via the connector object; wherein the service-related information comprises a state of the service; wherein the service manager is loaded in the client computer the first time the connector object attempts to send a formatted service request to the service manager; wherein at least one service is pre-registered with and mapped to the service manager; wherein the service manager persists for a predetermined amount of time after startup of the service manager; and wherein information maintained by the service (s) persists across multiple Web pages.

17. A method as recited in claim 1, wherein a service request received by the service manager is formatted by a connector object for the service manager, and a script wrapper is employed for different browser brands; wherein, for a first browser brand, an ActiveX control interface is provided to facilitate communication between the script of a Web page scripting space and the service manager; and wherein, for a second browser brand, a Plug-In interface is provided to facilitate communication between the script of a Web page scripting space and the service manager.

18. A computer-readable medium having computer-executable instructions for instructing a client computer to perform the acts recited in claim 1.

19. A client-computer including:
   a service manager object loaded into the client computer for managing services called by a browser script received in the scripting space of a browser of the client computer; and
   at least one service loaded into the client computer in communication with the service manager, said service manager being programmed to handle service requests received from scripting spaces of Web pages via a connector object wherein the client computer maintains service-related information in memory as one or more additional Web pages are received by the client computer.

20. A client computer as recited in claim 19, wherein the service manager receives service requests from a script via the connector object and forwards such requests to the at least one service, and receives event information from at least one service and forwards the event information to the scripting space via the connector object.

21. A client computer as recited in claim 19, wherein the service-related information comprises a state of the service.

22. A client computer as recited in claim 19, wherein the service manager is loaded in the client computer the first time the connector object attempts to send a formatted service request to the service manager.

23. A client computer as recited in claim 19, wherein the at least one service is pre-registered with and mapped to the service manager.

24. A client computer as recited in claim 19, wherein the service manager persists for a predetermined amount of time after startup of the service manager.

25. A client computer as recited in claim 19, wherein information maintained by the service(s) persists across multiple Web pages.

26. A client computer as recited in claim 19, wherein the service manager is loaded in the client computer the first time a service pre-registered with the service manager is called from a scripting space of Web pages.

27. A client computer as recited in claim 19, wherein a service request received by the service manager is formatted by the connector object for the service manager, but service requests from Web page scripting spaces can be made to the service manager through the connector object independently of browser brand.

28. A client computer as recited in claim 19, wherein, for a first browser brand, a connector object in the form of an ActiveX control interface is provided to facilitate communication between the script of a Web page scripting space and the service manager.

29. A client computer as recited in claim 19, wherein, for a second browser brand, a connector object in the form of a Plug-In interface is provided to facilitate communication between the script of a Web page scripting space and the service manager.

30. A client computer as recited in claim 19, wherein the service manager receives service requests from Web pages via a connector object and forwards such requests to the at least one service, and receives event information from the at least one service and forwards the event information to the scripting space via the connector object; wherein the service-related information comprises a state of the service; wherein the service manager is loaded the first time in the client computer the first time the connector object attempts to send a formatted service request to the service manager; wherein at least one service is pre-registered with and mapped to the service manager; wherein the service manager persists for a predetermined amount of time after startup of the service manager; and wherein information maintained by the service(s) persists across multiple Web pages.

31. A client computer as recited in claim 19, wherein a service request received by the service manager is formatted by the connector object for the service manager and a script wrapper is employed for different browser brands, wherein, for a first browser brand, an ActiveX control interface is provided to facilitate communication between a service request from the script of a Web page scripting space and the service manager, and wherein, for a second browser brand, a Plug-In interface is provided to facilitate communication between a service request from the script of a Web page scripting space and the service manager.

* * * * *